Sept. 12, 1950        R. O. BEARDSLEY ET AL        2,521,820
OPTICAL COMPARATOR FOR TESTING CAMS
Filed Nov. 14, 1946                                        3 Sheets-Sheet 3
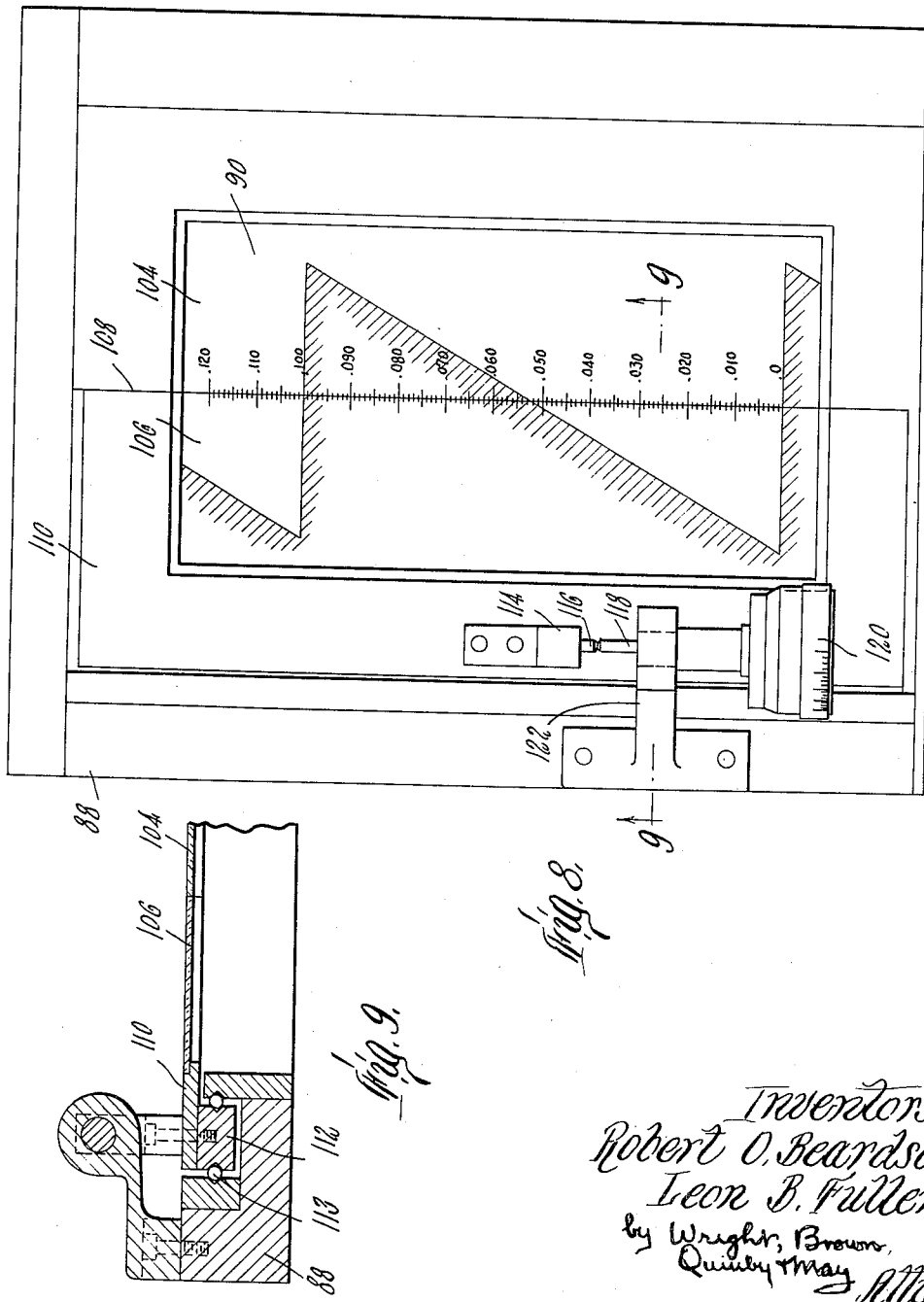
Inventors
Robert O. Beardsley
Leon B. Fuller
by Wright, Brown,
Quinby May
Attys.

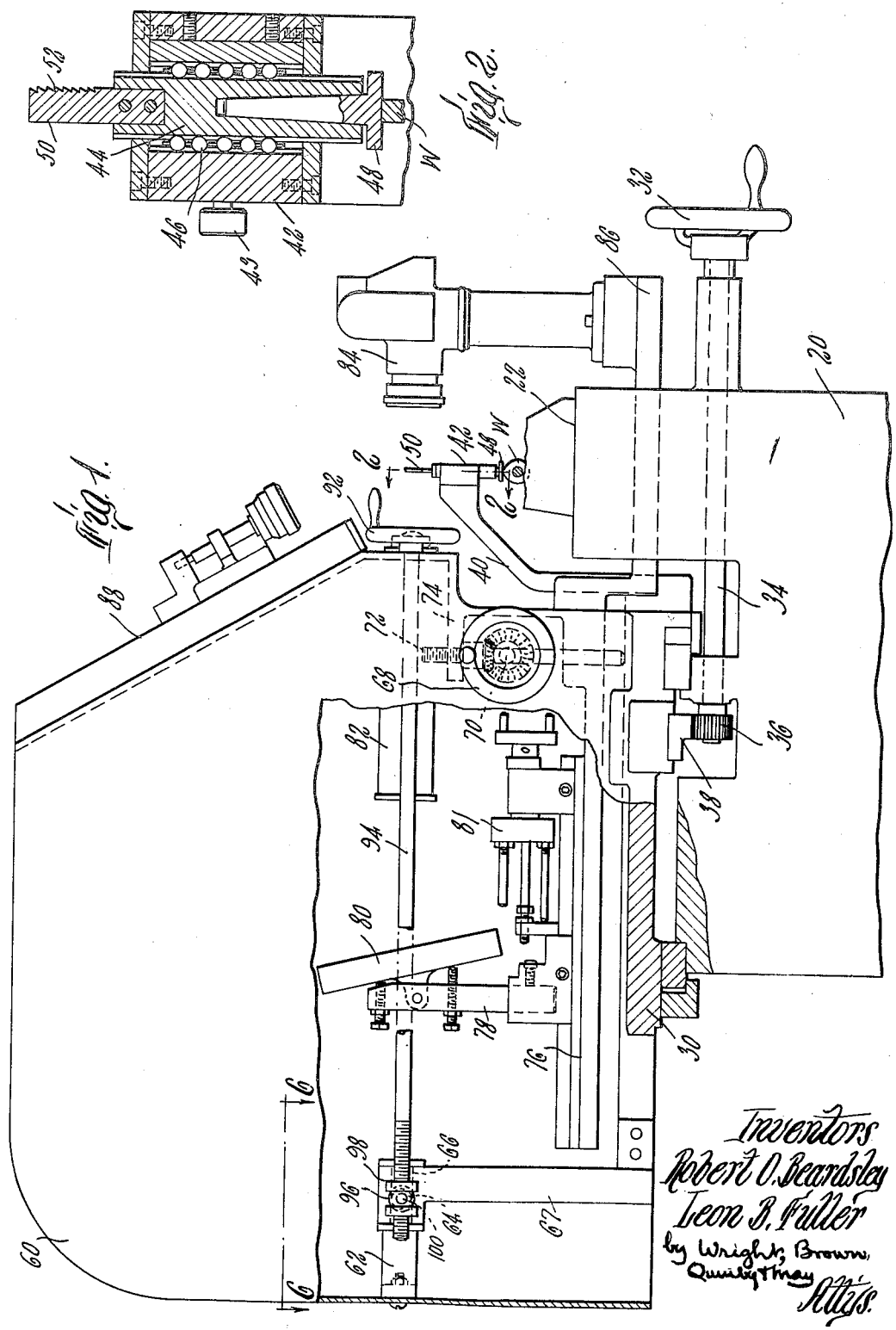

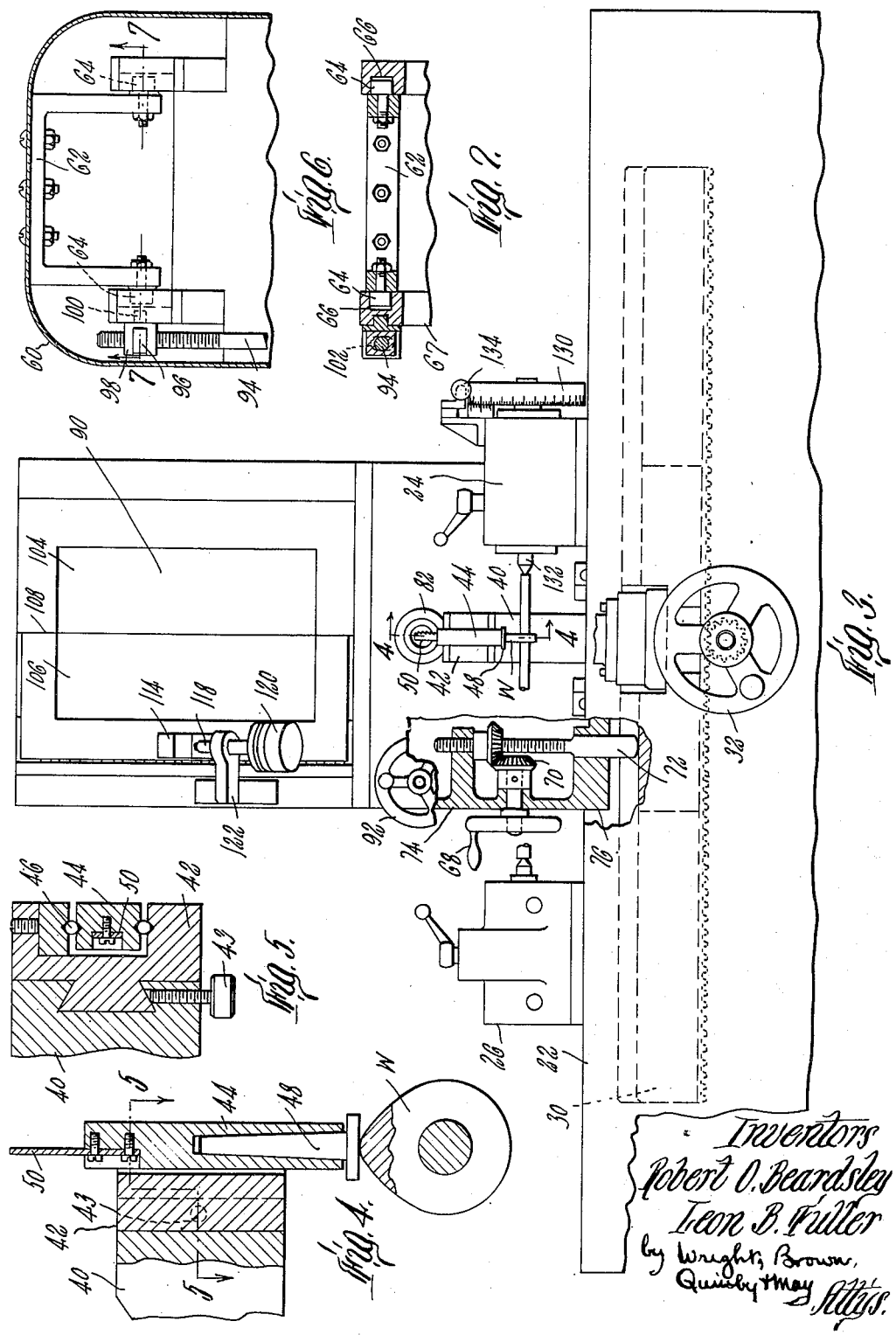

Patented Sept. 12, 1950

2,521,820

UNITED STATES PATENT OFFICE 2,521,820

OPTICAL COMPARATOR FOR TESTING CAMS

Robert O. Beardsley and Leon B. Fuller, Springfield, Vt., assignors to Jones & Lamson Machine Company, Springfield, Vt., a corporation of Vermont Application November 14, 1946, Serial No. 709,712

9 Claims. (Cl. 88—24)

This invention relates to improvements in comparators for the purpose of facilitating the testing of cams such, for example, as are on the cam shaft of an automobile motor. It is an object of the invention to provide a comparator of the general type described and illustrated in Patent No. 1,703,933, granted to Hartness and Porter on March 5, 1929, with improvements designed to adapt the mechanism particularly for easy and accurate testing of vertical distances from a horizontal line or plane of reference which is definitely located with respect to the fixed work table of the comparator. For example, the comparator hereinafter described is designed for checking on the radial distances of cam surfaces from the axis of the cam shaft on which the cams are fixed, the cam shaft being mounted over the work table with its axis definitely located with reference to the work table. For this purpose, a feeler gauge is mounted over the work table to bear on a cam and to cast a shadow image on the screen, the structure being arranged so that the contour of the shadow on the screen indicates the vertical distance of the point of contact on the cam above the axis of the cam shaft.

For a more complete understanding of the invention, reference may be had to the following description thereof, and to the drawings, of which:

Figure 1 is an end elevation of a comparator embodying the invention, portions being broken away;

Figure 2 is a section on the line 2—2 of Figure 1;

Figure 3 is a front elevation of the comparator shown in Figure 1;

Figure 4 is a section on the line 4—4 of Figure 3;

Figure 5 is a section on the line 5—5 of Figure 4;

Figure 6 is a section on the line 6—6 of Figure 1;

Figure 7 is a section on the line 7—7 of Figure 6;

Figure 8 is a front elevation of the chart and its supporting structure;

Figure 9 is a section on the line 9—9 of Figure 8.

The comparator illustrated on the drawings is for testing cams on a cam shaft and is provided with a base 20 having at the front thereof a work table 22. On the work table are adjustably mounted a headstock 24 and a tailstock 26 for supporting the work to be inspected. A carriage 30 is slidably mounted on the base 20 and is adapted to be moved transversely by operation of a hand wheel 32 at the front of the comparator, this hand wheel being mounted on a shaft 34 on the other end of which is a pinion 36 which meshes with a rack 38 secured to the carriage 30. From the front edge of the carriage a bracket 40 projects up and over the table 22. At the upper end of this bracket is a vertically adjustable head 42 which is dove-tailed to the bracket and is secured in adjusted position by a set-screw 43. A feeler gauge member 44 runs on ball bearings 46 which are vertically arranged in the head 42 and are adjusted so that the vertical movements of the gauge are free but lateral play is substantially eliminated. Wedged into a tapered bore in the lower end of the member 44 is a contact piece 48 which is in the shape of an automobile motor tappet when the comparator is to be used for testing cams on the cam shaft of an automobile motor. The contact piece 48 thus engages the cam W in just the same manner as the cam is engaged by a tappet when it is in place as a part of an automobile motor. At the upper end of the member 44 is a reference indicator 50 having one edge serrated with a succession of horizontal knife edges 52 spaced apart by equal vertical distances. For example, the space between successive knife edges 52 may conveniently be one-tenth of an inch. When the comparator is in use a light beam is cast across this serrated edge so as to project a shadow image of a portion thereof on a screen as hereinafter described. Since the bracket 40 which supports the feeler gauge is fixed on the carriage 30, it is evident that the gauge may be shifted from side to side with the carriage 30 by rotation of the hand wheel 32 so as to bring it directly over any selected one of a number of cams W on a shaft supported between the headstock 24 and tailstock 26. Lateral shifting of the gauge may also be employed to check up on the angle which the edge of the cam makes with the axis of the cam shaft. Cam edges of this kind are often slightly inclined with respect to the shaft axis so that when in use they will tend to impart a gradual rotating motion to the tappet so as to distribute the wear on the tappet.

Also mounted on the carriage 30 is a structure which is hinged to the carriage so that the structure may be rocked about a horizontal axis. This rockable structure comprises a housing 60 having a rear wall on which is secured a U-shaped bracket 62. This bracket is provided with pivot elements 64 (Figure 6) which engage in horizontal slots 66 in standards 67 on the carriage 30 to provide the hinge connection. The housing may be rocked about the axis of the pivot elements 64 by manipulation of a hand wheel 68 which is connected by miter gears 70 to a vertical screw 72, the lower end of which bears on the carriage 30. Rotation of the hand wheel 68 causes rotation of the screw 72 which is threaded through a bracket 74 on the interior of the housing 60. This elevates the forward portion of the housing so that it rocks about the rocking axis which is near the rear thereof. The slots 66 for pivot elements 64 are to permit forward and rearward adjustment of the rockable structure as hereinafter described.

The rockable structure which includes the housing 60 also includes a horizontal frame member 76 on which is adjustably mounted a standard 78 supporting a mirror 80. The standard 78 and mirror 80 are adjustable forward and rearward to vary the degree of magnification of the shadow image cast on the screen as hereinafter described. A set of stops are carried by a support 81 to be used selectively in connection with the slidable standard 78 to locate the mirror at any one of a number of predetermined positions on the member 76, as described and illustrated in Patent No. 2,222,165, granted to Beardsley and Finn on November 19, 1940. The front wall of the housing supports a projecting lens system 82 through which a beam of light may be directed from a lamp housing 84 mounted on a forward extension 86 of the frame 76 so that the lamp housing is also a part of the rockable structure. Mounted in the upper front wall of the housing 60 is a rectangular frame 88 which contains a translucent screen or chart 90. The optical system of the comparator consists of a source of light within the lamp house 84 which also contains a condensing lens (not shown) for the projection of a horizontal beam of light from the lamp housing into the lens system 82. This beam is projected past the serrated edge of the gauge member 50 so that a magnified shadow image of the serrated edge 52 is reflected by the mirror 80 to the screen 90. When the feeler gauge engages a cam W, the gauge is displaced upward according to the radial distance of the point of contact from the axis of the cam. Hence the elevation of the gauge element 50 is a measure of such radial dimension of the cam. In order to accommodate cams of different radial dimensions, it is sometimes necessary to elevate the optical system in order to keep the beam of light on the serrated edge portion 52. For this purpose the hand wheel 68 is operated to raise or lower the rockable structure which includes the lamp housing 84, the lens system 82, the mirror 80 and the screen 88. Since it is important to have a sharp focus of the shadow image cast upon the screen, it may be necessary to adjust the said structure toward the front or rear, after it has been rocked, to sharpen the focus. For this purpose, a hand wheel 92 is mounted on a shaft 94 which is journalled at its forward end in the front wall of the housing 60. The rear end portion of the shaft 94 is screw threaded and engages in a nut 96 (Figure 6). This nut is slidably fitted between the arms of a U-shaped block 98 which has a stub shaft 100 fitted in one of the standards 67. By rotation of the hand wheel 92, the housing 62 and all of the other members associated therewith may be shifted forward or back as the shaft 94 rotates in the nut 96. Figures 1 and 6 show the stub shaft 100 coaxial with the pivot members 64. If the hand wheel 92 is operated to shift the rockable structure forward or rearward from such position, the stub shaft will then be out of line with the pivot members 64. In order then to avoid binding of the pivot members when the house is tilted, the arms of the block 98 have oval apertures 102 through which the shaft 94 extends, thus permitting the nut 96 to adjust itself vertically a limited but sufficient distance.

Figure 8 shows the screen 90 on which a shadow image of a portion of the serrated edge 52 is cast, such shadow image being preferably of somewhat more than the vertical length between successive horizontal edges. The optical system is preferably such that the magnification is 100 times. That means that in the particular apparatus illustrated the vertical distance between the shadow images of consecutive horizontal edges of the serrated edge 52 is 10 inches. The screen 90 is in two parts 104 and 106, these parts being divided by a vertical median line 108 which is the boundary between the abutting edges of the two parts of the screen. Scale divisions are printed or otherwise made on the two parts of the chart on either side of the median line 108, these scale divisions being equally spaced apart by distances equal to a predetermined fraction of the distance between the shadow images of successive horizontal edges. As shown in Figures 8, the 10 inch vertical distance between edges is preferably divided into 100 equal parts by the scale divisions on the sections of the chart. One of these sections, section 106 for example, is vertically movable with respect to the other section. For this purpose, the section 106 is mounted on a frame member 110 which is secured to a bar 112. This bar is movably mounted on ball bearings 113 in a side member of the frame 88. On the frame member 110 is mounted an abutment bracket 114 having an opposing anvil 116 projecting downward to engage the end of a micrometer anvil 118. The latter anvil is axially adjustable by means of a micrometer screw mechanism having a finger knob 120 which is rotatable and which is supported by a bracket 122 fixed on a side member of the frame 88. The periphery of the finger knob 120 is preferably provided with scale marks which are calibrated with reference to the pitch of the screw which moves the rod 118 so that each scale division on the finger knob represents a predetermined fraction of a scale division on the chart 90. For example, in the mechanism illustrated on the drawings, if the finger knob 120 is turned so that 10 scale marks pass the index, the movable portion 106 of the chart will travel up or down a distance equal to one scale division on the chart. Thus, if the shadow image of a horizontal edge falls between scale divisions on the chart, the finger knob 120 may be rotated sufficiently to bring one of the scale divisions on the movable portion 106 into exact registry with the shadow image. If the comparator is properly adjusted, the radial dimension of the cam which is being tested can then be read from the scale on the fixed portion of the chart and the scale on the finger knob 120.

In order to determine the rate of lift of a tappet by a cam it is desirable to measure and tabulate the lift of the tappet for each degree of rotation of the cam. For this purpose the headstock 24 is preferably provided with indexing means which may include a wheel 130 having scale divisions on its rim indicating degrees of angle, this wheel being mounted on a spindle 132 journalled in the headstock. For slow motion rotation of the wheel, an ordinary worm and gear may be provided, the worm shaft having a finger wheel 134 thereon for convenient manipulation. By such means, successive readings may quickly and easily be made from the chart and tabulated for successive degrees of angular change of the cam, and the values thus obtained may be plotted to form a graph.

We claim:

1. In a comparator having a base and a stationary work table thereon, a carriage laterally slidable on said base, means operable to adjust said carriage laterally, a gauge mounted on said carriage over said work table, a structure pivotally mounted on said carriage and adjustably rockable as a unit about a horizontal axis, said structure including a lamp stand in front of the work table, a housing behind the work table, a screen mounted on the forward portion of said housing and a lens system and mirror in said housing, means operable to rock said structure about its axis, and means operable to shift said structure forward and rearward.

2. In a comparator having a base and a stationary work table thereon, a carriage laterally slidable on said base, means operable to adjust said carriage laterally, a gauge mounted on said carriage in position to engage a work piece on said table, a structure including a lamp stand in front of said work table, a housing behind the work table, a screen mounted on the forward portion of the housing and a lens system and mirror in said housing, said structure being hinged to said carriage near the rear thereof and adjustably supported on the carriage near the front thereof, and means for adjustably rocking said structure about its hinge axis.

3. In a comparator having a base and a stationary work table thereon, a structure carried by said base including a lamp stand in front of said table, a housing behind said table, a screen mounted in the front wall of said housing, and a lens system and mirror in said housing arranged to receive a light beam from a lamp on said stand and to project the same on said screen, said structure being pivotally connected to said base near the rear thereof and being adjustably supported near the front thereof, and means for adjustably rocking said structure about its pivot axis.

4. In a comparator having a base and a stationary work table thereon, a carriage laterally slidable on said base, means operable to adjust said carriage laterally, a feeler gauge mounted on said carriage over said work table to engage different parts of a work piece on said table when the carriage is laterally shifted, a lamp stand mounted on said carriage in front of said table, a frame hinged to said carriage, a lens system and screen mounted on said frame behind said table, said lamp, lens system and screen being arranged so that a shadow image of a portion of said gauge is cast on said screen, means operable to rock said frame through a limited angle about its hinge axis, and means for shifting said frame forward and rearward independently of its angular position.

5. A comparator for testing cams on a cam shaft or the like, comprising a base, a work table mounted on said base, means on said table for supporting a cam shaft with its axis horizontal, a carriage movable on said base in a direction parallel to the axis of a shaft supported on said table, a feeler gauge supported above said shaft and vertically movable to bear against one of said cams, a bracket on said carriage for supporting said feeler gauge, and means mounted on said carriage for forming a magnified shadow image of a portion of said feeler gauge, said means and feeler gauge being movable as a unit with said carriage to bring the feeler gauge into position to bear on any selected cam on said shaft without disturbing the relative adjustment between the parts of said means and said feeler gauge.

6. A comparator for testing cams on a cam shaft or the like, comprising a base, a stationary work table on said base, means on said table for supporting a cam shaft and cams, a carriage laterally movable on said base, a bracket mounted on said carriage and extending over said table, a vertically movable feeler gauge mounted on said bracket and adapted to bear against a cam on said shaft, the upper portion of said feeler gauge having a vertically spaced series of horizontal edges equal distances apart, and an optical system mounted on said carriage and comprising a light source in front of the work table, means for projecting a beam of horizontal parallel rays from said light source against said upper portion of the feeler, a translucent screen, and means for magnifying the shadow image of a portion of said gauge and focussing the same on said screen, said bracket, light source and optical system being movable as a unit with said carriage to bring said feeler gauge into position for engagement with any selected cam on said cam shaft.

7. In a comparator for testing cams on a cam shaft or the like, means for supporting a cam shaft with its axis horizontal, a feeler gauge having a lower portion shaped like a tappet and an upper portion with vertically spaced horizontal edges, means for supporting said feeler gauge over said shaft so that said lower portion bears on a cam to be tested, a screen having reference marks thereon, means for casting a magnified shadow image of a portion of said gauge on said screen for comparison with said reference marks, and means for moving said gauge, screen and shadow casting means as a unit in a direction parallel to the axis of said shaft to bring said feeler into position for engagement with any selected cam on said shaft.

8. In a comparator, in combination, a screen, a feeler gauge having vertically spaced horizontal edges and means for casting on said screen a magnified shadow image of a portion of said gauge, said screen having two relatively movable parts defined by the vertical median, scale marks on one said parts equally spaced apart by distances equal to a predetermined fraction of the distance between the shadow outlines of two successive horizontal edges of the gauge, similarly spaced scale marks on the other part of said chart adjacent to said median, means including a screw and a handwheel thereon for adjustably shifting one of said parts relatively to the other, and scale marks on said wheel for indicating relative movements of said parts equivalent to predetermined fractions of one scale division on said chart.

9. A comparator for testing cams on a shaft or the like, comprising a base, a stationary work table on said base, means on said table for supporting a cam shaft with cams, indexing means on said table for facilitating step by step rotation of the shaft to successive predetermined angular positions for testing corresponding cam measurements, a feeler gauge supported by said base over said table and vertically movable into contact with a cam supported as aforesaid, the upper portion of said feeler gauge having a vertically spaced series of horizontal edges equal distances apart, a screen, a source of light, and an optical system directing a beam of light past the upper portion of said gauge and focussing an enlarged shadow image of a portion thereof upon said screen.

ROBERT O. BEARDSLEY.
LEON B. FULLER.

REFERENCES CITED

The following references are of record in the file of this patent:

UNITED STATES PATENTS

| Number | Name | Date |
|---|---|---|
| 1,157,796 | Morehouse | Oct. 26, 1915 |
| 1,589,349 | Bausch et al. | June 22, 1926 |
| 1,703,933 | Hartness et al. | Mar. 5, 1929 |
| 1,732,730 | Porter et al. | Oct. 22, 1929 |
| 1,789,009 | Luce | Jan. 13, 1931 |
| 2,035,780 | Beardsley et al. | Mar. 31, 1936 |
| 2,222,165 | Beardsley et al. | Nov. 19, 1940 |
| 2,372,470 | Bergstrom | Mar. 27, 1945 |
| 2,401,382 | Willard | June 4, 1946 |
| 2,414,867 | Gradisar et al. | Jan. 28, 1947 |
| 2,422,611 | Becker | June 17, 1947 |